US012356520B2

(12) United States Patent
Huang et al.

(10) Patent No.: US 12,356,520 B2
(45) Date of Patent: Jul. 8, 2025

(54) LIGHTING APPARATUS

(71) Applicant: LEEDARSON LIGHTING CO., LTD., Fujian (CN)

(72) Inventors: Shihai Huang, Fujian (CN); Hongkui Jiang, Fujian (CN)

(73) Assignee: LEEDARSON LIGHTING CO., LTD., Fujian (CN)

(*) Notice: Subject to any disclaimer, the term of this patent is extended or adjusted under 35 U.S.C. 154(b) by 99 days.

(21) Appl. No.: 18/210,040

(22) Filed: Jun. 14, 2023

(65) Prior Publication Data

US 2024/0422875 A1 Dec. 19, 2024

(51) Int. Cl.
*H05B 45/325* (2020.01)
*H05B 45/22* (2020.01)
*H05B 45/3725* (2020.01)

(52) U.S. Cl.
CPC ........... *H05B 45/325* (2020.01); *H05B 45/22* (2020.01); *H05B 45/3725* (2020.01)

(58) Field of Classification Search
CPC ... H05B 45/325; H05B 45/22; H05B 45/3725
See application file for complete search history.

(56) References Cited

U.S. PATENT DOCUMENTS

2017/0013663 A1* 1/2017 Bora .................... H04B 17/318
2018/0242422 A1* 8/2018 Choi ...................... H05B 45/20
2019/0053346 A1* 2/2019 Hopwood ............ H05B 45/395
2021/0267039 A1* 8/2021 Chung .................. H05B 47/19

FOREIGN PATENT DOCUMENTS

CN 108463026 A * 8/2018 ......... H05B 33/0818
CN 106958746 B * 12/2020 ............... F21K 9/00

* cited by examiner

*Primary Examiner* — Abdullah A Riyami
*Assistant Examiner* — Syed M Kaiser
(74) *Attorney, Agent, or Firm* — Chun-Ming Shih; LANWAY IPR SERVICES

(57) ABSTRACT

A lighting apparatus includes a first LED module, a second LED module, a wireless module and a power module. The first LED module has a first light parameter. The second LED module has a second light parameter. The first light parameter is different from the second light parameter. The wireless module receives an external command and converts the external command to a driving control signal. The power module converts an AC power source to a first DC power and a second DC power. The first DC power has a first driving current and a second driving current respectively supplied to the first LED module and the second LED module. The power module adjusts a power ratio between the first driving current and the second driving current according to the driving control signal.

19 Claims, 8 Drawing Sheets

LIGHTING APPARATUS

FIELD

The present invention is related to a lighting apparatus, and more particularly related to a lighting apparatus with a flexible power supply.

BACKGROUND

LED light devices have become a game-changer in the lighting industry, offering several advantages over past designs such as incandescent and fluorescent lights. One of the primary advantages of LED light devices is their energy efficiency. LEDs are incredibly efficient in converting electricity into light, resulting in significant energy savings compared to traditional lighting technologies. They consume much less power while providing the same or even better illumination, making them a cost-effective choice for both residential and commercial lighting applications.

Another advantage of LED light devices is their long lifespan. LEDs have an impressive operational life that can range from 25,000 to 50,000 hours or even more, depending on the quality of the LEDs and their usage. This longevity far exceeds that of traditional incandescent or fluorescent lights, which need frequent replacements. LED light devices not only reduce maintenance costs but also contribute to reducing waste and the environmental impact associated with frequent bulb replacements.

LED light devices also offer enhanced durability and robustness. Unlike incandescent bulbs, LEDs are solid-state devices that do not contain fragile filaments or glass components. This makes them highly resistant to shocks, vibrations, and other physical impacts, making them ideal for applications in rugged environments or areas prone to frequent movement or vibration.

Additionally, LED light devices provide instant illumination without the need for warm-up time. Unlike fluorescent lights that can take a few seconds to reach full brightness, LEDs light up immediately, allowing for instant illumination when you flip the switch. This feature is particularly beneficial in areas where immediate lighting is required, such as hallways, bathrooms, or outdoor spaces.

LED light devices are also highly customizable in terms of color options and dimming capabilities. With the ability to emit light in various colors and shades, LED lights offer versatility in creating different lighting effects and moods. Additionally, LEDs can be easily dimmed, allowing users to adjust the brightness levels according to their preferences or specific lighting needs. This flexibility in color and dimming options makes LED light devices suitable for a wide range of applications, from ambient lighting to task lighting and even decorative purposes.

When it comes to controlling LED light devices, traditional wall switches can be used. LED lights are compatible with standard wall switches found in most homes and buildings. However, it's important to note that some LED light devices, especially those with advanced features like color-changing or dimming capabilities, may require specific dimmer switches or controllers for optimal functionality. These specialized switches or controllers are designed to work with the specific electrical requirements of LED lights, ensuring smooth and reliable operation without flickering or compatibility issues.

In recent years, there have been advancements in LED light device control systems, such as the introduction of smart lighting solutions. Smart LED light devices can be controlled wirelessly through smartphone apps, voice commands, or home automation systems. These smart features provide additional convenience, allowing users to adjust lighting settings, create schedules, and even integrate their LED lights with other smart devices for a seamless home automation experience.

In summary, LED light devices offer numerous advantages over past lighting designs. They are energy-efficient, long-lasting, durable, and provide instant illumination. LED lights are highly customizable in terms of color options and dimming capabilities, making them versatile for various applications. Despite their advanced features, LED light devices can still be controlled by traditional wall switches, ensuring compatibility with existing electrical infrastructure. Additionally, the emergence of smart lighting solutions has brought added convenience and flexibility to LED light device control. Overall, LED light devices have revolutionized the lighting industry, providing efficient, long-lasting, and customizable lighting solutions for homes, businesses, and beyond.

Power supply and flexible control are critical to provide a nice LED light device. Power design is crucial for LED devices due to several factors such as cost, flexibility, stability, and the integration of IoT technology.

Firstly, cost plays a significant role in LED device design. LED lights are known for their energy efficiency, but inefficient power design can offset those benefits. A well-designed power system ensures optimal energy conversion and distribution, maximizing the cost-effectiveness of LED devices. Efficient power designs minimize power losses, resulting in lower electricity bills and overall operational costs.

Secondly, flexibility is essential in LED device power design. LED lights come in various forms, sizes, and applications, and each may have specific power requirements. A well-designed power system should accommodate different voltage and current needs, allowing LED devices to operate reliably and efficiently across a wide range of configurations. Flexibility in power design ensures compatibility with different LED products, enabling seamless integration and ease of use.

Thirdly, stability is crucial in LED device power design. Stable power supply is necessary to ensure consistent light output and prevent flickering or fluctuations that can be detrimental to visual comfort and quality. A robust power design with proper voltage regulation, current control, and surge protection safeguards LED devices from voltage spikes, transient events, and electrical noise, enhancing their reliability and longevity.

Furthermore, the combination of IoT technology with LED devices amplifies the importance of power design. IoT integration enables smart lighting capabilities, allowing LED devices to be connected, controlled, and monitored remotely. Power design must consider the additional requirements of IoT connectivity, such as power over Ethernet (POE) or wireless power transfer, to ensure seamless communication and enable the full potential of IoT features.

Moreover, IoT-enabled LED devices often involve sensors, data transmission, and advanced control algorithms. These additional functionalities require efficient power management systems that can handle the increased power demands while maintaining stability and reliability. Proper power design ensures that LED devices can support the connectivity and processing needs of IoT technology, enabling smart automation, energy monitoring, and adaptive lighting control.

In summary, power design plays a critical role in LED devices, considering factors such as cost, flexibility, stability, and the integration of IoT technology. A well-designed power system optimizes energy efficiency, ensures compatibility with different LED configurations, provides stable operation, and supports the advanced capabilities of IoT-enabled LED devices. By prioritizing efficient power design, manufacturers can enhance the performance, cost-effectiveness, and user experience of LED devices while embracing the potential of IoT advancements in the lighting industry.

In past, complicated power supply makes the cost difficult to lower down. In addition, complicated designs usually cause higher error rate.

It is beneficial to make a better power design for various LED devices.

SUMMARY

In some embodiments, a lighting apparatus includes a first LED module, a second LED module, a wireless module and a power module.

The first LED module has a first light parameter.

The second LED module has a second light parameter.

The first light parameter is different from the second light parameter.

The wireless module receives an external command and converts the external command to a driving control signal.

The power module converts an AC power source to a first DC power and a second DC power.

The first DC power has a first driving current and a second driving current respectively supplied to the first LED module and the second LED module.

The power module adjusts a power ratio between the first driving current and the second driving current according to the driving control signal.

In some embodiments, the power module includes an integrated chip with a power pin for receiving an AC power, a driving control pin for receiving the driving control signal, a first power output pin coupled to the wireless module, a second power output pin coupled to the first LED module, and a third power output pin coupled to the second LED module.

In some embodiments, the driving control signal is translated to a PWM ratio between the first driving current and the second driving current.

In some embodiments, the first light parameter and the second light parameter have different color temperatures.

The driving control signal is used for mixing a light by the first LED module and the second LED module with a required color temperature.

In some embodiments, the external command indicates a color temperature value. The power module looks up a table stored in a storage to convert the external command to the corresponding PWM ratio.

In some embodiments, the table stores a first energy to light intensity output curve corresponding to the first LED module and stores a second energy to light intensity output curve corresponding to the second LED module.

In some embodiments, the external command includes data of the first energy to light intensity output curve and the second energy to light intensity output curve sent to the power module to update the table.

In some embodiments, the power module has a register for storing the first light parameter and the second light parameter.

The power module has a controller to read the register to calculate the corresponding PWM ratio by calculating the first light parameter, the second light parameter and the required color temperature.

In some embodiments, the wireless module transmits a parameter configuration to the power module.

The power module determines a function set of the wireless module according to the parameter configuration.

The power module selectively switches a working mode from multiple candidate working modes corresponding to the function set.

In some embodiments, the power module selects a stand-alone working mode if the wireless module is not detected.

In some embodiments, if the power module determines that the wireless module does not function normally, the power module selects the stand-alone working mode by ignoring the control signal provided by the wireless module.

In some embodiments, the lighting apparatus may also include a manual switch for users to select an initial setting.

The manual switch is coupled to the power module.

The initial setting is transmitted to the wireless module via the power module for an external device to know the initial setting.

In some embodiments, the external command includes an overriding command to ignore the initial setting.

In some embodiments, there are multiple power modules coupled to the same wireless module.

The each power module is coupled to one corresponding first LED module and one corresponding second LED module.

In some embodiments, the multiple power modules are connected in series.

The control signal of the wireless module is forwarded from one power module to another module.

In some embodiments, there are multiple wireless modules coupled to the power module.

The multiple wireless modules are corresponding to different wireless protocols.

In some embodiments, when more than one wireless modules receive the external commands at the same time.

The external commands are combined to instruct the power module.

In some embodiments, when one wireless module fails to connect, the power module stops supplying power to the wireless module.

In some embodiments, the lighting apparatus may also include a network switch and a light housing.

The light housing is used for disposed the power module, the first LED module, the second LED module and the network switch.

The network switch indicates a wireless protocol to be operated by the wireless module.

In some embodiments, the wireless module has a first wireless mode and a second wireless mode.

The power module supplies a first power to the wireless module in the first wireless mode, and supplies a second power to the wireless in the second wireless mode.

The first power and then second power have different energy levels.

DETAILED DESCRIPTION

Figure 1:
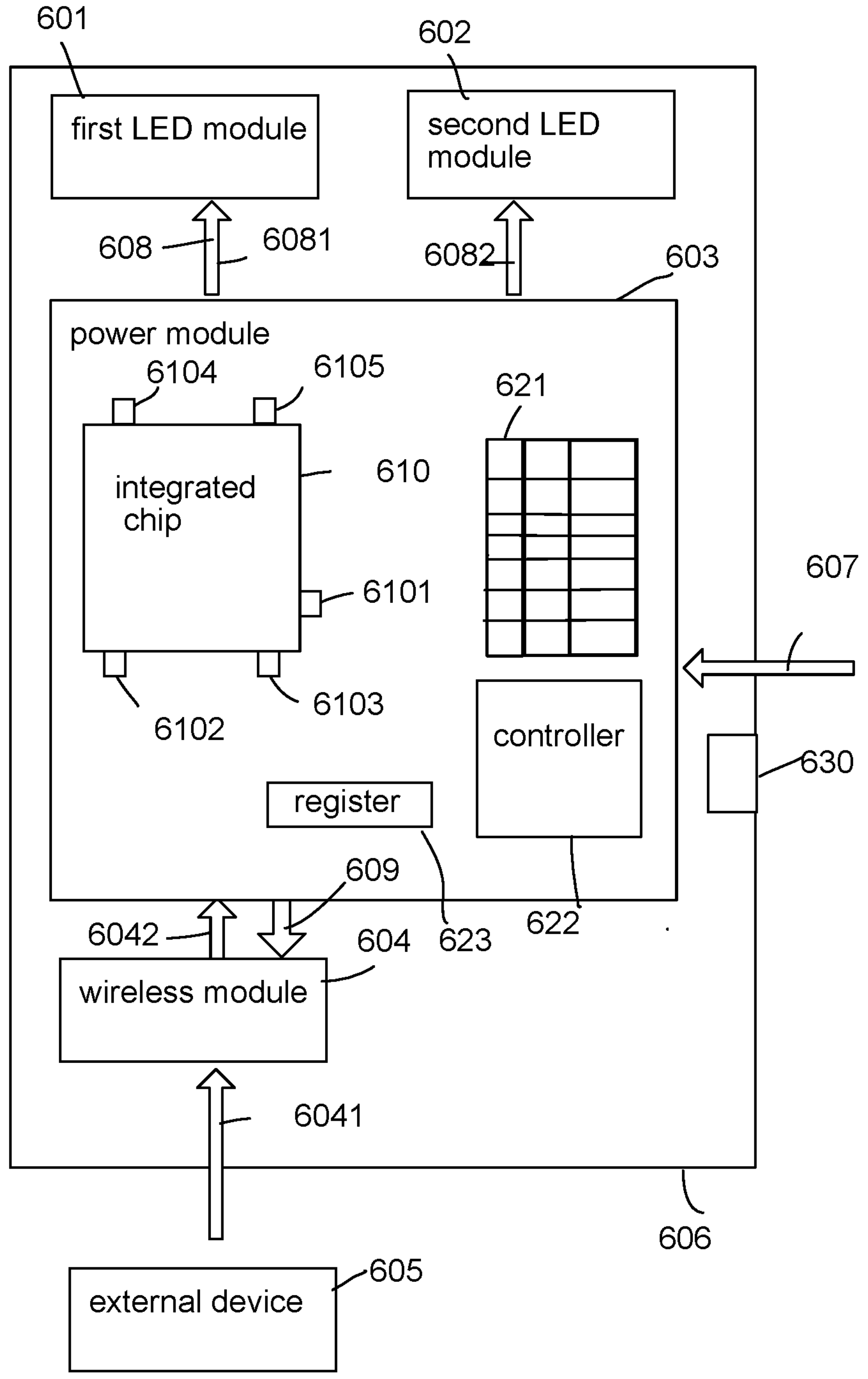
FIG. 1 illustrates a lighting apparatus embodiment.

In FIG. 1, a lighting apparatus includes a first LED module 601, a second LED module 602, a wireless module 604 and a power module 603. The first LED module 601, the second LED module 602, the wireless module 604 and the power module 603 are disposed in a light housing 606.

The light housing 606 may have different shapes and structures depending on various light types, e.g. a downlight, a spot light, a panel light, a light strip, or a blub.

The first LED module 601 has a first light parameter.

The second LED module 602 has a second light parameter.

The first light parameter is different from the second light parameter. For example, the first LED module 601 may contain LED chips that emit a first light of high color temperature while the second LED module 602 may contain LED chips that emit a second light of low color temperature. By mixing the two LED modules and adjusting their light intensity, a mixed light of required color temperature may be obtained.

Please be noted that the first LED module and the second LED module are used for examples. In some other embodiments, there may be more than two types of LED modules and the light parameter may include colors or other light parameters like color rendering indexes.

The wireless module 604 receives an external command 6041 from an external device 605, which may be a mobile phone, a remote control or a network server, and converts the external command 6041 to a driving control signal 6042.

In some embodiments, the wireless module 604 includes a processor for parsing the external command 6041. The external command 6041 may include instructions, data and/or even codes to update the power module 603 when the power module 603 has a storage to store its processing logic. The code in the external command 6041 may be translated and stored in the power module 603 to update its operation logic.

The power module 603 converts an AC power source 607 to a first DC power 608 and a second DC power 609.

The first DC power 608 has a first driving current 6081 and a second driving current 6082 respectively supplied to the first LED module 601 and the second LED module 602.

The power module 603 adjusts a power ratio between the first driving current 6081 and the second driving current 6081 according to the driving control signal 6042.

Please note that the power ratio may refers a total accumulated power received by the first LED module 601 and the second LED module 602. For example, even the current supplied to the first LED module 601 and the second LED module 602 have the same current value and the same current voltage, the power module 603 may change the time ratio supplying currents to the first LED module 601 and the second LED module 602. For example, a constant current is alternatively supplied to the first LED module and the second LED module but with different time ratio, e.g. 60% of time supplying power the first LED module 601 and 40% of time supplying power to the second LED module 602. By adjusting the time ratio, the overall mixing parameter is different and controlled by the power module 603.

In some embodiments, the power module 603 includes an integrated chip 610 with a power pin 6101 for receiving an AC power 607, a driving control pin 6102 for receiving the driving control signal, a first power output pin 6103 coupled to the wireless module 604, a second power output pin 6104 coupled to the first LED module 601, and a third power output pin 6105 coupled to the second LED module 602.

In some embodiments, the driving control signal is translated to a PWM ratio between the first driving current and the second driving current.

PWM is a technique that allows precise control over the brightness of LED lights by rapidly switching them on and off at varying durations. By adjusting the width of the pulses, the average power delivered to the LED can be regulated, resulting in smooth and accurate brightness control.

With PWM, LED light control reaches new levels of efficiency and versatility. By rapidly switching the LEDs on and off at high frequencies that exceed human perception, PWM achieves seamless dimming capabilities without the drawbacks of traditional methods such as resistive or analog dimming.

A microcontroller or specialized PWM controller may be used to generate a constant voltage or current source. The controller then modulates this source by switching it on and off rapidly using a high-frequency signal. By adjusting the duty cycle—the ratio of the ON time to the total period—the controller precisely controls the amount of time the LED is powered during each cycle, directly influencing its perceived brightness. The higher the duty cycle, the brighter the LED light appears.

PWM is especially ideal for LED light control due to its energy efficiency. Unlike traditional dimming methods that waste energy by converting excess power into heat, PWM allows LEDs to operate at their optimal efficiency. By pulsing the power supply, PWM reduces power consumption and extends the lifespan of LED lights, making them more environmentally friendly and cost-effective in the long run.

Additionally, PWM provides seamless integration with other control systems and technologies. It can easily be integrated into smart lighting solutions, allowing for dynamic control and synchronization with IoT devices and automated lighting programs. PWM opens up a world of possibilities for creating captivating lighting effects, customizing color transitions, and adapting the lighting environment to suit different moods and occasions.

In some embodiments, the first light parameter and the second light parameter have different color temperatures.

The driving control signal is used for mixing a light by the first LED module and the second LED module with a required color temperature.

In some embodiments, the external command indicates a color temperature value.

The power module looks up a table 621 stored in a storage, e.g. a memory device, to convert the external command to the corresponding PWM ratio.

In some embodiments, the wireless module 604 translates the external command when a processor is integrated with the wireless module 604. In some other embodiments, the external command is transmitted to the power module 603 directly as the driving control signal. In such case, the power module 603 handles and processes the external command.

In some embodiments, the table 621 stores a first energy to light intensity output curve corresponding to the first LED module and stores a second energy to light intensity output curve corresponding to the second LED module.

This is important because different LED modules may have different energy to light intensity curves. By adding the table 621, the power module 603 may achieve accurate mixing task.

In some embodiments, the external command includes data of the first energy to light intensity output curve and the second energy to light intensity output curve sent to the power module to update the table.

In some embodiments, the power module has a register 623 for storing the first light parameter and the second light parameter.

The power module has a controller 622 to read the register 623 to calculate the corresponding PWM ratio by calculating the first light parameter, the second light parameter and the required color temperature.

In some embodiments, the wireless module 604 transmits a parameter configuration to the power module 603.

The power module 603 determines a function set of the wireless module 604 according to the parameter configuration. For example, the parameter configuration indicate the type and function of the wireless module 604

The power module 603 selectively switches a working mode from multiple candidate working modes corresponding to the function set.

In other words, the same power module 603 may be used to work with different types of wireless modules 604. By using the parameter configuration, the power module 603 may automatically select a proper working mode to work with the installed type of the wireless module 604.

In some embodiments, the power module 603 selects a stand-alone working mode if the wireless module is not detected. In other words, the power module 603 may optionally be disposed without the wireless module 604. In other words, different settings of the light devices may be sold to the market but share the same power module 603, without need to customize different power module 603 for different models of light devices. This bring great effect on cost control and design flexibility.

In some embodiments, if the power module 603 determines that the wireless module 604 does not function normally, the power module 603 selects the stand-alone working mode by ignoring the control signal provided by the wireless module 604.

In such case, the power module 603 has a fault tolerance. Even the wireless module 604 has some problem and fails to work normally, the lighting apparatus still can provide basic function, e.g. to illuminate the space.

In some embodiments, the lighting apparatus may also include a manual switch 630 for users to select an initial setting.

The manual switch 630 is coupled to the power module 603.

The initial setting is transmitted to the wireless module 604 via the power module 603 for an external device 605 to know the initial setting.

In some embodiments, the external command includes an overriding command to ignore the initial setting.

Figure 7:
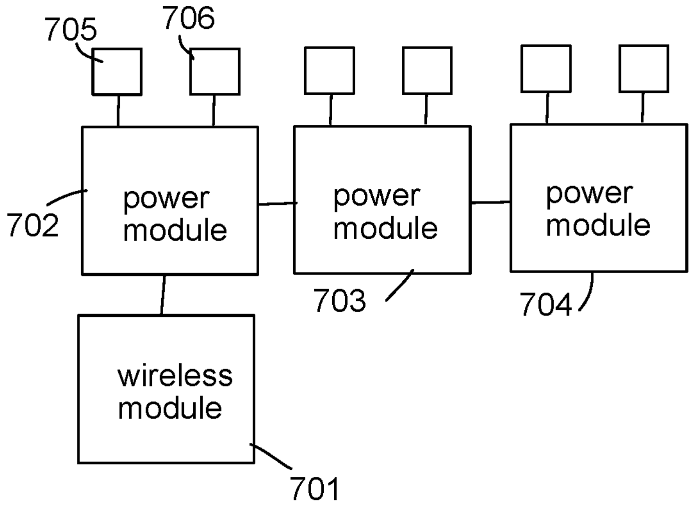
FIG. 7 illustrates another configuration of an embodiment.

In FIG. 7, there are multiple power modules 702, 703, 704 coupled to the same wireless module 701.

The each power module 702, 703, 704 is coupled to one corresponding first LED module 705 and one corresponding second LED module 706.

In some embodiments, the multiple power modules are connected in series, as illustrated in FIG. 7.

The control signal of the wireless module is forwarded from one power module to another module, e.g. from the power module 702 to the power module 703.

Figure 8:
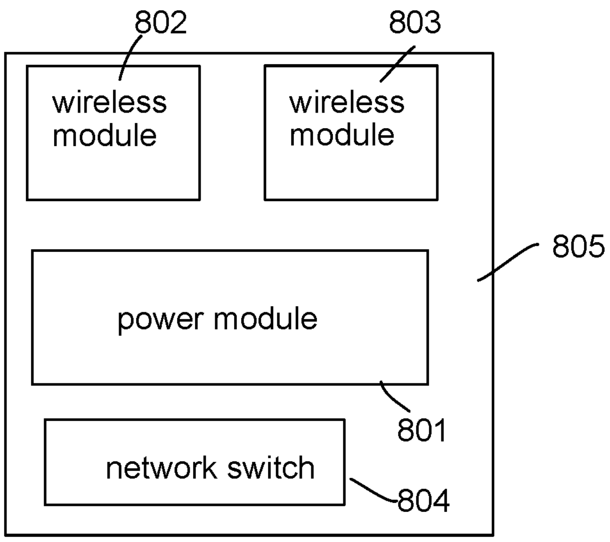
FIG. 8 illustrates an IC architecture diagram.

In FIG. 8, there are multiple wireless modules 802, 803 coupled to the power module 801.

The multiple wireless modules 802, 803 are corresponding to different wireless protocols, e.g. one for Wi-Fi and the other for Bluetooth.

In some embodiments, when more than one wireless modules receive the external commands at the same time.

The external commands are combined to instruct the power module 801.

For example, the wireless module 803 receives commands from a mobile phone, while the wireless module 802 receives server data from a server. The external commands from two sources are combined together to control the lighting apparatus.

In some embodiments, when one wireless module fails to connect, the power module stops supplying power to the wireless module.

In some embodiments, the lighting apparatus may also include a network switch 804 and a light housing 805.

The light housing 805 is used for disposed the power module 801, the first LED module, the second LED module and the network switch 804.

The network switch 804 indicates a wireless protocol to be operated by the wireless module.

In some embodiments, the wireless module has a first wireless mode and a second wireless mode.

The power module supplies a first power to the wireless module in the first wireless mode, and supplies a second power to the wireless in the second wireless mode.

In other words, the power module does not need to supply power to both wireless modules, which saves energy, particularly helpful in emergent scenario while a battery is used for providing power.

The first power and then second power have different energy levels.

Figure 2:
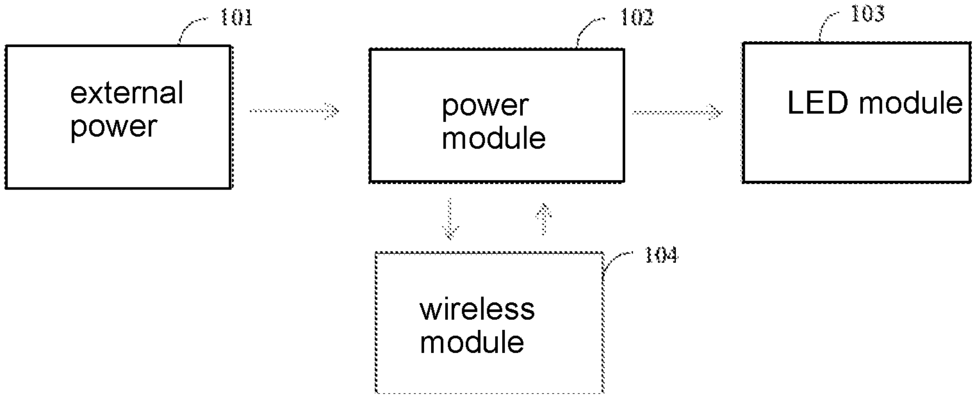
FIG. 2 illustrates another circuit structure example.

Please refer to FIG. 2, which illustrates another lighting apparatus control diagram.

In FIG. 2, the external power 101 is coupled to the power module 102. The power module 102 supplies power both to the LED module 103 and the wireless module 104.

Figure 3:
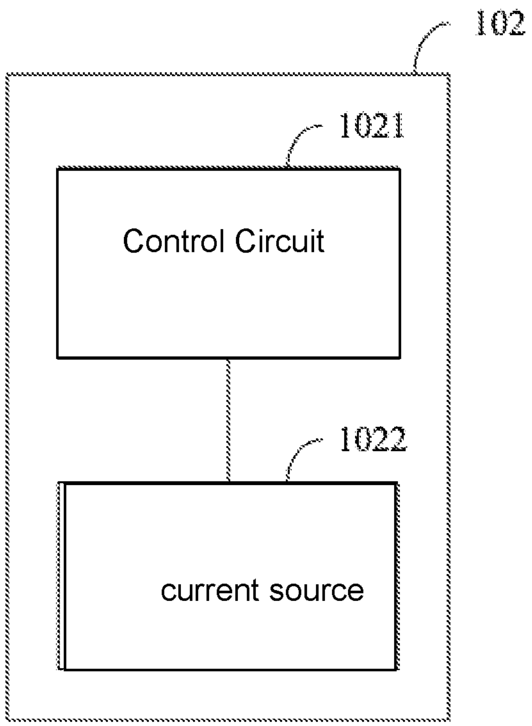
FIG. 3 illustrates an inner structure of a power module example.

In FIG. 3, the power module 102 has a control circuit 1021 and a current source 1022. The control circuit 1021 receives a control signal to control output the current source 1022, as mentioned above.

Figure 4:
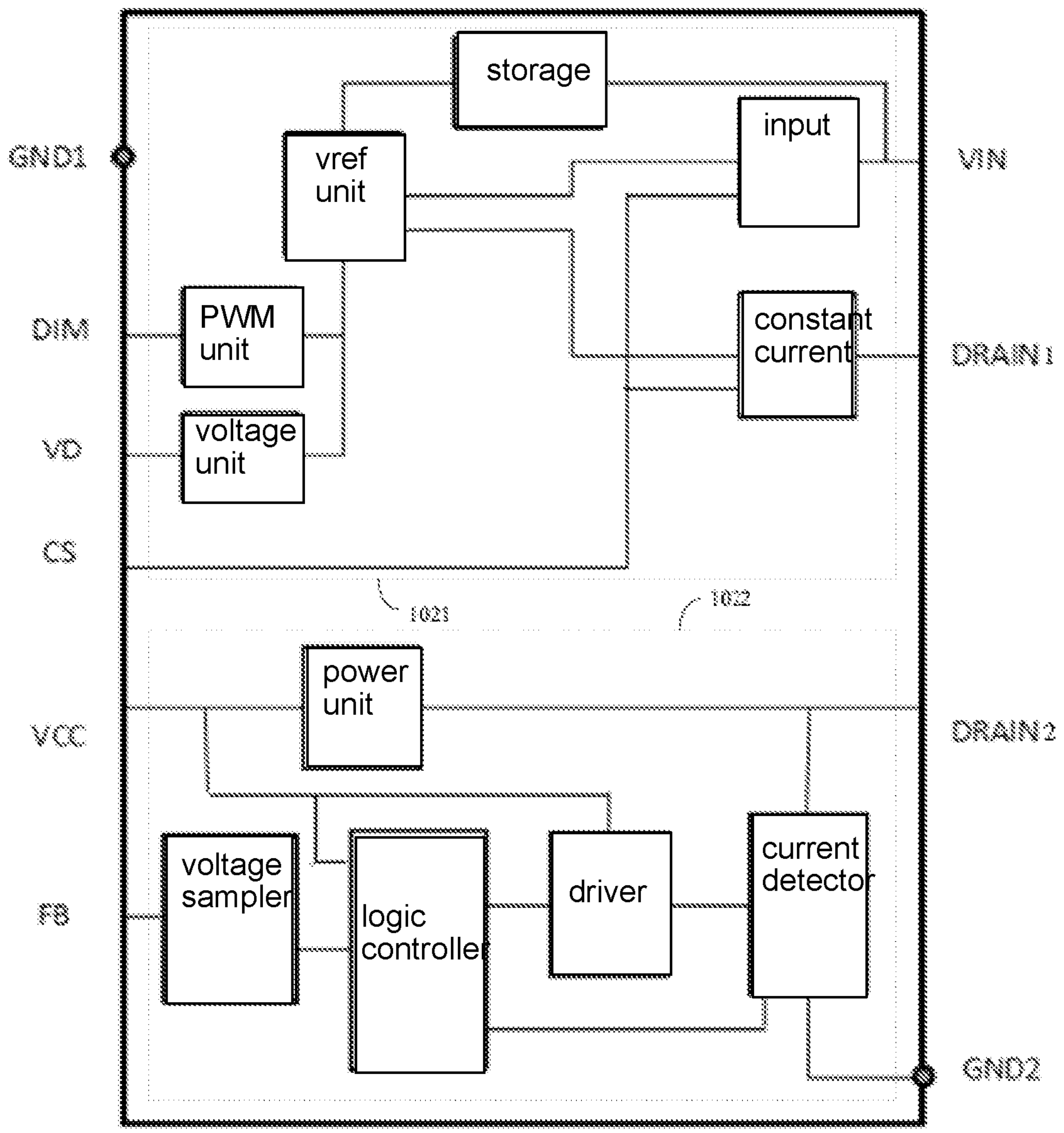
FIG. 4 illustrates another inner structure of a power module example.

In FIG. 4, a first example of an integrated circuit chip is provided.

In FIG. 4, there is a vref unit, a storage, an input, a constant current, a PMW unit, a voltage unit, a power unit, a voltage sampler, a logic controller, a driver, a current detector. These components are all integrated in a chip to lower down the cost and simplify the design.

Figure 5:
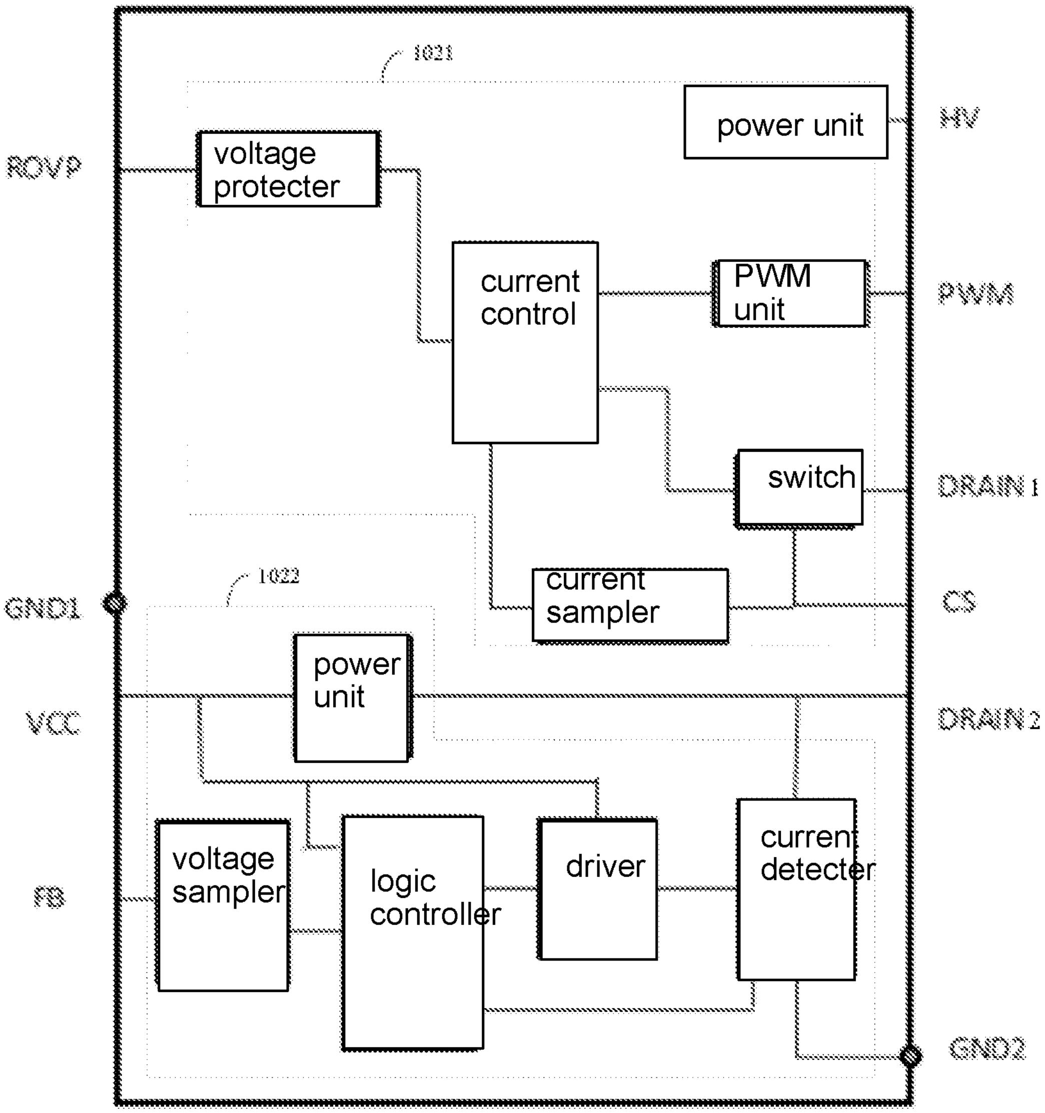
FIG. 5 illustrates another inner structure of a power module example.

In FIG. 5, another integrated chip example is provided. The control circuit 1021 and the current source 1022 respectively contain the voltage protector, the current control, the power unit, the PWM unit, the switch, the current sampler, the current detector, the driver, the power unit, the logic controller and the voltage sampler.

Figure 6:
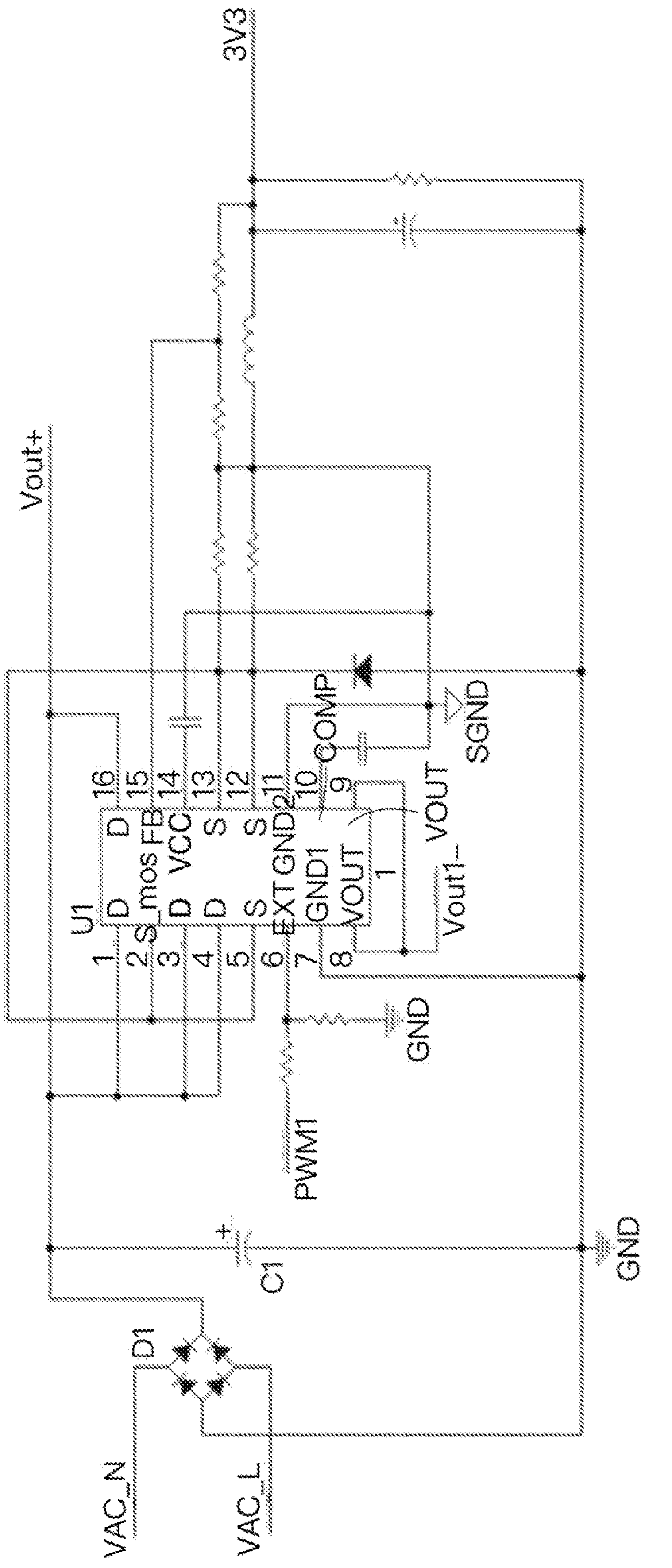
FIG. 6 illustrates a circuit diagram illustrating how to use the power module.

FIG. 6 shows an example of such integrated chip are connected to a transformer and output necessary power to all components.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. A lighting apparatus, comprising:

a first LED module with a first light parameter;

a second LED module with a second light parameter, wherein the first light parameter is different from the second light parameter;

a wireless module for receiving an external command and converting the external command to a driving control signal; and a power module for converting an AC power source to a first DC power and a second DC power, wherein the first DC power has a first driving current and a second driving current respectively supplied to the first LED module and the second LED module, wherein the power module adjusts a power ratio between the first driving current and the second driving current according to the driving control signal, wherein the wireless module has a first wireless mode and a second wireless mode, wherein the power module supplies a first power to the wireless module in the first wireless mode, and supplies a second power to the wireless in the second wireless mode, wherein the first power and then second power have different energy levels.

2. The lighting apparatus of claim 1, wherein the power module comprises an integrated chip with a power pin for receiving an AC power, a driving control pin for receiving the driving control signal, a first power output pin coupled to the wireless module, a second power output pin coupled to the first LED module, and a third power output pin coupled to the second LED module.

3. The lighting apparatus of claim 2, wherein the driving control signal is translated to a PWM ratio between the first driving current and the second driving current.

4. The lighting apparatus of claim 3, wherein the first light parameter and the second light parameter have different color temperatures, wherein the driving control signal is used for mixing a light by the first LED module and the second LED module with a required color temperature.

5. The lighting apparatus of claim 4, wherein the external command indicates a color temperature value, wherein the power module looks up a table stored in a storage to convert the external command to the corresponding PWM ratio.

6. The lighting apparatus of claim 5, wherein the table stores a first energy to light intensity output curve corresponding to the first LED module and stores a second energy to light intensity output curve corresponding to the second LED module.

7. The lighting apparatus of claim 6, wherein the external command comprises data of the first energy to light intensity output curve and the second energy to light intensity output curve sent to the power module to update the table.

8. The lighting apparatus of claim 4, wherein the power module has a register for storing the first light parameter and the second light parameter, wherein the power module has a controller to read the register to calculate the corresponding PWM ratio by calculating the first light parameter, the second light parameter and the required color temperature.

9. The lighting apparatus of claim 1, wherein the wireless module transmits a parameter configuration to the power module, wherein the power module determines a function set of the wireless module according to the parameter configuration, wherein the power module selectively switches a working mode from multiple candidate working modes corresponding to the function set.

10. The lighting apparatus of claim 9, wherein the power module selects a stand-alone working mode if the wireless module is not detected.

11. The lighting apparatus of claim 10, wherein if the power module determines that the wireless module does not function normally, the power module selects the stand-alone working mode by ignoring the control signal provided by the wireless module.

12. The lighting apparatus of claim 1, further comprising a manual switch for users to select an initial setting, wherein the manual switch is coupled to the power module, wherein the initial setting is transmitted to the wireless module via the power module for an external device to know the initial setting.

13. The lighting apparatus of claim 12, wherein the external command comprises an overriding command to ignore the initial setting.

14. The lighting apparatus of claim 1, wherein there are multiple power modules coupled to the same wireless module, wherein the each power module is coupled to one corresponding first LED module and one corresponding second LED module.

15. The lighting apparatus of claim 14, wherein the multiple power modules are connected in series, wherein the control signal of the wireless module is forwarded from one power module to another module.

16. The lighting apparatus of claim 1, wherein there are multiple wireless modules coupled to the power module, wherein the multiple wireless modules are corresponding to different wireless protocols.

17. The lighting apparatus of claim 16, wherein when more than one wireless modules receive the external commands at the same time, wherein the external commands are combined to instruct the power module.

18. The lighting apparatus of claim 16, wherein when one wireless module fails to connect, the power module stops supplying power to the wireless module.

19. The lighting apparatus of claim 1, further comprising a network switch and a light housing, wherein the light housing is used for disposed the power module, the first LED module, the second LED module and the network switch, wherein the network switch indicates a wireless protocol to be operated by the wireless module.

* * * * *